Feb. 20, 1945.  A. J. ROSENBERGER  2,370,076
CONTROL VALVE
Filed Feb. 13, 1943  2 Sheets-Sheet 2

Inventor
ALBERT J. ROSENBERGER
by Dawson Corry & Booth
Attorneys

Patented Feb. 20, 1945

2,370,076

UNITED STATES PATENT OFFICE 2,370,076

CONTROL VALVE

Albert J. Rosenberger, Chicago, Ill., assignor to Republic Flow Meters Company, Chicago, Ill., a corporation of Illinois Application February 13, 1943, Serial No. 475,708

5 Claims. (Cl. 277—7)

This invention relates to control valves and more particularly to a valve for use in a regulating system for obtaining either manual or automatic control as desired.

One of the objects of the invention is to provide a control valve of a unitary construction which can be operated to connect a regulating system for normal automatic control or which can be used to cut off the automatic control and control the system manually.

Another object of the invention is to provide a control valve including a sleeve controlling ports in a valve body and a valve member in the sleeve for controlling ports in the sleeve.

Another object of the invention is to provide a control valve including a rotatable control member for effecting one controlling operation and a slidable control member for effecting another control operation.

The above and other objects and advantages of the invention will be more readily apparent from the following description when read in connection with the accompanying drawing, in which—

Figure 1:
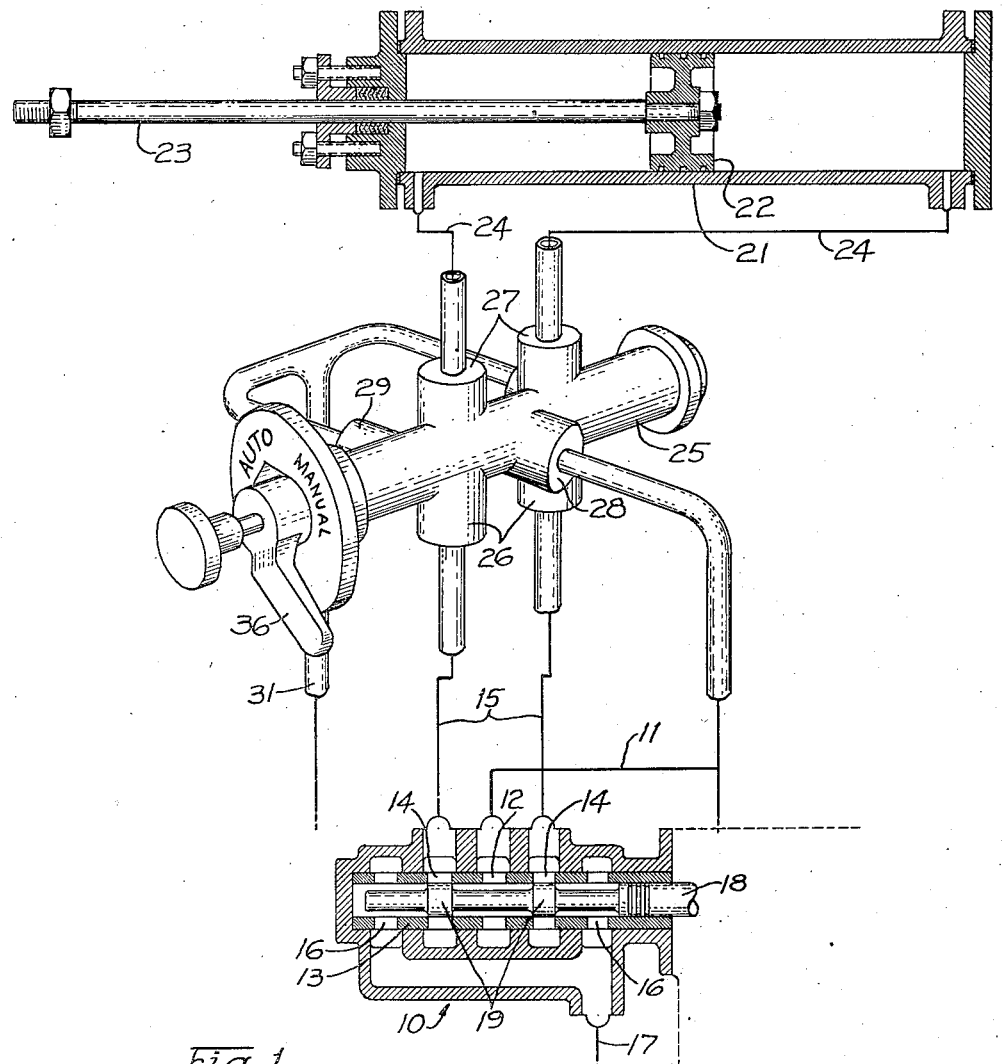
Figure 1 is a diagrammatic view of a regulating system embodying the invention.

Figure 1 illustrates diagrammatically a regulating system including a regulator having a pilot valve indicated generally at 10 controlled automatically by the regulator mechanism which may be of any desired type in response to a condition to be regulated. The pilot valve is supplied with fluid from a line 11 communicating with a central port 12 in a cylindrical valve body 13. Outlet ports 14 in the body communicate with lines 15 leading to a fluid motor for effecting an adjustment which will affect the condition and drain ports 16 communicating through the valve body with a return line 17. A valve plunger or spool 18 is slidably mounted in the valve and includes spaced enlarged portions 19 cooperating with the ports 14 to close them. When the spool is in its central position as shown, both ports 14 are cut off but when it is shifted, one of the ports is connected to the supply line 11 and the other to the waste or return line 17.

The control motor controlled by the regulator includes a cylinder 21 in which a piston 22 is slidable. The piston has a rod 23 extending through one end of the cylinder and adapted to be connected to a valve or other control instrumentality. The cylinder is supplied with operating fluid through lines 24 connetced to its opposite ends.

Figure 2:
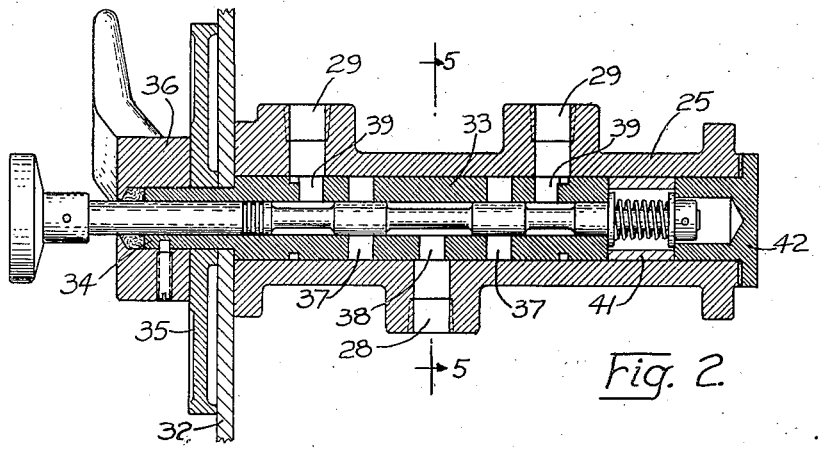
Figure 2 is a horizontal section through the valve of Figure 1.
Figure 3:
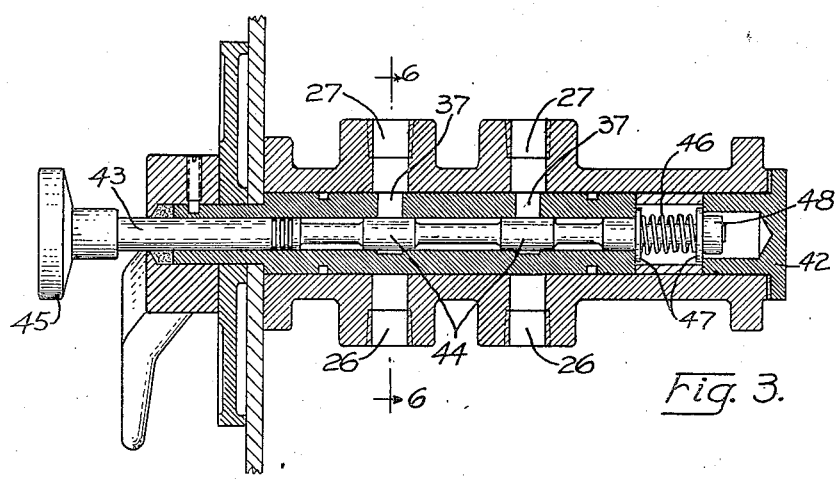
Figure 3 is a vertical section through the valve of Figure 1.

The valve of the present invention is adapted to be interposed between the lines 15 and 24 and includes a valve body 25 which may be mounted on a control panel or the like. The valve body as best seen in Figures 2 and 3, includes a cylinder bore and has on its lower side ports 26 for connection with the lines 15 and on its upper side diametrically opposite ports 27 for connection to the lines 24. At one side the body is formed with an inlet port 28 for connection to the supply line and on its other side with drain ports 29 connected to a waste or return line 31 as shown in Figure 1.

Figure 4:
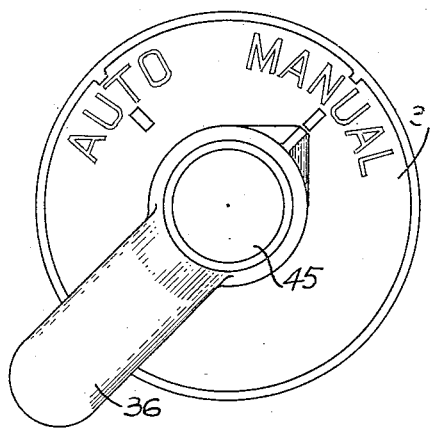
Figure 4 is a front elevation of the valve showing the control handles.
Figure 5:
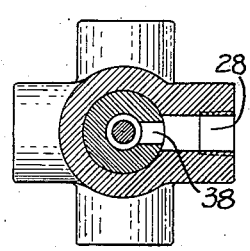
Figure 5 is a partial section on the line 5—5 of Figure 2.

The body is shown mounted on a panel indicated at 32 and carries rotatably on its interior a valve sleeve 33 having a reduced end 34 extending through an opening in the panel. The outer face of the panel carries an indicator dial or plate 35 and a handle 36 is connected to the reduced end 34 of the sleeve for turning it. As shown in Figure 4, the plate 35 is marked with two positions indicating respectively the position of the handle 36 for automatic and manual control.

Figure 6:
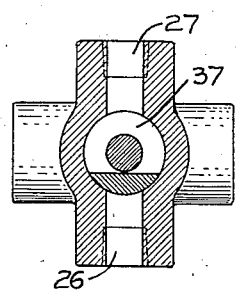
Figure 6 is a partial section on the line 6—6 of Figure 3.

The sleeve is formed with appropriate ports and passages for cooperation with the several ports in the valve body including cut out slots 37 as shown in Figure 6 to register with the ports 26 and 27. It will be noted that these slots extend throughout more than half of the sleeve so that when the sleeve is properly turned, they will provide for free communication between the ports 26 and 27, for automatic control and when the sleeve is turned to its manual position as shown in Figures 3 and 6, the ports 26 from the regulator will be cut off.

For manual control the sleeve is provided with small ports 38 and 39 adapted to register respectively with the inlet port 28 and with the drain ports 29. The sleeve may be held in position in the body by a collar 41 abutting against a fixed end closure 42 for the body.

Within the sleeve 33 is slidably mounted a valve plunger 43 having enlarged portions 44 for cooperation with the ports 37 in the sleeve. The plunger may be shifted longitudinally by means of a handle 45 adjacent the handle 36.

The plunger is normally held in a neutral position in which the enlargements 44 close the ports 37 by a centering spring which is yieldable in either direction. The centering spring as shown comprises a coil spring 46 around a reduced portion of the plunger seating against annular rings or washers 47 which are slidable on the plunger reduced portion. Outward movement of the washers is limited by abutment against an enlargement at the end of the plunger reduced portion on one end and by a nut or like fastening 48 on the outer end of the plunger. The washers 47 abut against the end of the valve sleeve 33 and the closure cap 42 as shown, both of which are fixed against longitudinal movement in the valve body. With this construction the plunger is normally held in the position shown in Figures 2 and 3 by the spring 46 but can be moved in either direction against the spring.

In operation, when it is desired to control the motor 21 automatically, the valve handle 36 is turned to its automatic position in which the opposite ports 26 and 27 are connected through the slots 37 and ports 28 and 29 are closed by the valve sleeve. In this position the pipes 15 and 24 are connected directly so that the motor will be under the direct and sole control of the regulator pilot valve 10.

For manual control, the handle 36 is turned to its manual position in which the ports 26 are closed, the ports 27 are connected through the slots 37 to the interior of the valve body, the ports 28 and 38 are in register, and ports 29 and 39 are in register. At this time, the regulator pilot valve is completely cut off from the motor and it will remain in its set position due to closing of the slots 37 by the enlargements 44 on the plunger 43. To cause a manually controlled movement of the motor the plunger 43 may be shifted longitudinally to connect one of the slots 37 to the inlet port 38 and the other slot to its drain port 39 so that the motor piston 22 will be moved.

It will be noted that this movement continues as long as the plunger is held in shifted position against the spring 46 and as soon as the plunger is released, it will be centered by the spring 46 to cut off both ports 37 and lock the motor in its adjusted position.

While one embodiment of the invention has been shown and described in detail, it will be understood that this is illustrative only and is not intended to be taken as a definition of the scope of the invention, reference being had for this purpose to the appended claims.

What is claimed is:

1. A control valve comprising an elongated valve body having a cylindrical bore and a plurality of ports in the side of the body opening into the bore, a cylindrical sleeve in the bore having ports therein cooperating with the ports in the body to establish intercommunication between certain of the ports in the body when the sleeve is in one rotative position and to interrupt said intercommunication and establish communication between certain of the ports in the body and the interior of the sleeve when it is in another rotative position, and a valve member movably mounted in the sleeve to control the ports therein.

2. A control valve comprising an elongated valve body having a cylindrical bore and a plurality of ports in the side of the body opening into the bore, a cylindrical sleeve in the bore having ports therein cooperating with the ports in the body to establish intercommunication between certain of the ports in the body when the sleeve is in one rotative position and to interrupt said intercommunication and establish communication between certain of the ports in the body and the interior of the sleeve when it is in another rotative position, and an elongated valve member slidable longitudinally in the sleeve to control the ports therein.

3. A control valve comprising an elongated valve body having a cylindrical bore and a plurality of ports in the side of the body opening into the bore, a cylindrical sleeve in the bore having ports therein cooperating with the ports in the body to establish intercommunication between certain of the ports in the body when the sleeve is in one rotative position and to interrupt said intercommunication and establish communication between certain of the ports in the body and the interior of the sleeve when it is in another rotative position, an elongated valve member slidable longitudinally in the sleeve to control the ports therein, and resilient means urging the valve member to a neutral position in the sleeve and yieldable to permit movement of the valve in either direction.

4. A control valve comprising an elongated valve body having a bore and regulator, motor, supply and drain ports in the side of the body opening into the bore, a sleeve movable in the bore from a manual to an automatic position and formed with passages registering with the ports to establish communication between the regulator and motor ports and cut off the supply and drain ports when the sleeve is in automatic position and to cut off the regulator ports and establish communication between the other ports and the interior of the sleeve when it is in manual position, and a valve member movable in the sleeve to control communication between said other ports when the sleeve is in manual position.

5. A control valve comprising a valve body formed with an elongated bore having a plurality of side ports therein, a sleeve movable in the body and formed with passages to establish direct intercommunication between certain of the ports when the sleeve is in one position and to interrupt said intercommunication and establish communication between certain of the ports and the interior of the sleeve when the sleeve is in another position, a valve member movably mounted in the sleeve formed with control portions cooperating with the passages in the sleeve, and separate control handles on the sleeve and valve member by which they may be separately adjusted.

ALBERT J. ROSENBERGER.